(12) United States Patent
Church

(10) Patent No.: US 7,390,012 B2
(45) Date of Patent: Jun. 24, 2008

(54) FOLDING BABY BUGGY

(75) Inventor: Graham Church, Northhampton (GB)

(73) Assignee: Armon Ltd, Geneva (CH)

( * ) Notice: Subject to any disclaimer, the term of this patent is extended or adjusted under 35 U.S.C. 154(b) by 264 days.

(21) Appl. No.: 11/235,733

(22) Filed: Sep. 26, 2005

(65) Prior Publication Data
US 2006/0066076 A1 Mar. 30, 2006

(30) Foreign Application Priority Data
Sep. 28, 2004 (GB) ................................. 0421534.9

(51) Int. Cl.
*B62B 7/00* (2006.01)
(52) U.S. Cl. ........................................ 280/642; 280/658
(58) Field of Classification Search .................. 280/639, 280/641, 642, 643, 644, 647, 648, 650, 657, 280/658
See application file for complete search history.

(56) References Cited
U.S. PATENT DOCUMENTS 4,072,318 A * 2/1978 Laune .......................... 280/42
4,386,790 A * 6/1983 Kassai ......................... 280/650
4,762,335 A * 8/1988 Kassai ......................... 280/649
4,844,504 A * 7/1989 Bigo ........................... 280/642
4,915,401 A * 4/1990 Severson et al. .............. 280/30
5,074,575 A * 12/1991 Bigo ........................... 280/642
5,979,928 A * 11/1999 Kuo ............................ 280/642
6,135,487 A * 10/2000 Flannery et al. ............. 280/642

OTHER PUBLICATIONS

Search Report (GB0421534.9), Jun. 28, 2005.

* cited by examiner

*Primary Examiner*—Christopher Ellis
*Assistant Examiner*—Brian Swenson
(74) *Attorney, Agent, or Firm*—Andrew Wilford

(57) ABSTRACT

A foldable buggy having two side frames and a child support means attached to each side frame by a respective support member, each side frame having forward strut means, rear strut means and vertical strut means, the forward strut means comprising an upper section and a lower section pivotally connected to each other to allow folding and unfolding, the support member being slidably mounted on the lower section, and including a strut means pivotally attached to the upper section and the support means, such that when the buggy is folded from an unfolded state to a folded state, the strut means causes the support member to slide down the lower section.

6 Claims, 2 Drawing Sheets

FOLDING BABY BUGGY

FIELD OF THE INVENTION

The present invention relates to push chairs or prams for infants, and in particular foldable push chairs or prams.

The main aspect of the present invention relates to the folding mechanism for the side frames.

BACKGROUND OF THE INVENTION

The standard folding baby buggy consists of two side frames separated by cross-bars and having a seat or cot mounted between them. Some push-chairs can have the two side frames moved together for folding (3-dimensional fold); others have the distance between the side frames fixed (2-dimensional fold). The standard form of side frame has a delta-shaped side frame, with a front sloping strut or bar with a front wheel at its bottom end and a handle at its top end, a rear sloping bar with a rear wheel at its bottom end and hinged at its top end to a point around the middle of the front sloping bar, and a base bar, linking the two sloping bars, which is roughly horizontal and located toward the bottom end of the rear sloping bar. The base bar is hinged at about its mid-point.

The side frame can then be folded by bending the base bar at its central hinge, with its two halves coming together, and bringing together the rear sloping bar and the bottom end of the front sloping bar.

OBJECT OF THE INVENTION

An object of the invention is to provide a new side frame folding mechanism.

SUMMARY OF THE INVENTION

According to the invention, there is provided a foldable buggy having two side frames and a child support means attached to each side frame by a respective support member, each side frame having forward strut means, rear strut means and vertical strut means, the forward strut means comprising an upper section and a lower section pivotally connected to each other to allow folding and unfolding, the support member being slidably mounted on the lower section, and including a strut means pivotally attached to the upper section and the support means, such that when the buggy is folded from an unfolded state to a folded state, the strut means causes the support member to slide down the lower section.

BRIEF DESCRIPTION OF THE DRAWINGS

A baby buggy embodying the invention will now be described, by way of example, without limitation to the scope of the invention, and with reference to the drawings, in which.

DESCRIPTION OF THE PREFERRED EMBODIMENT

Figure 1:
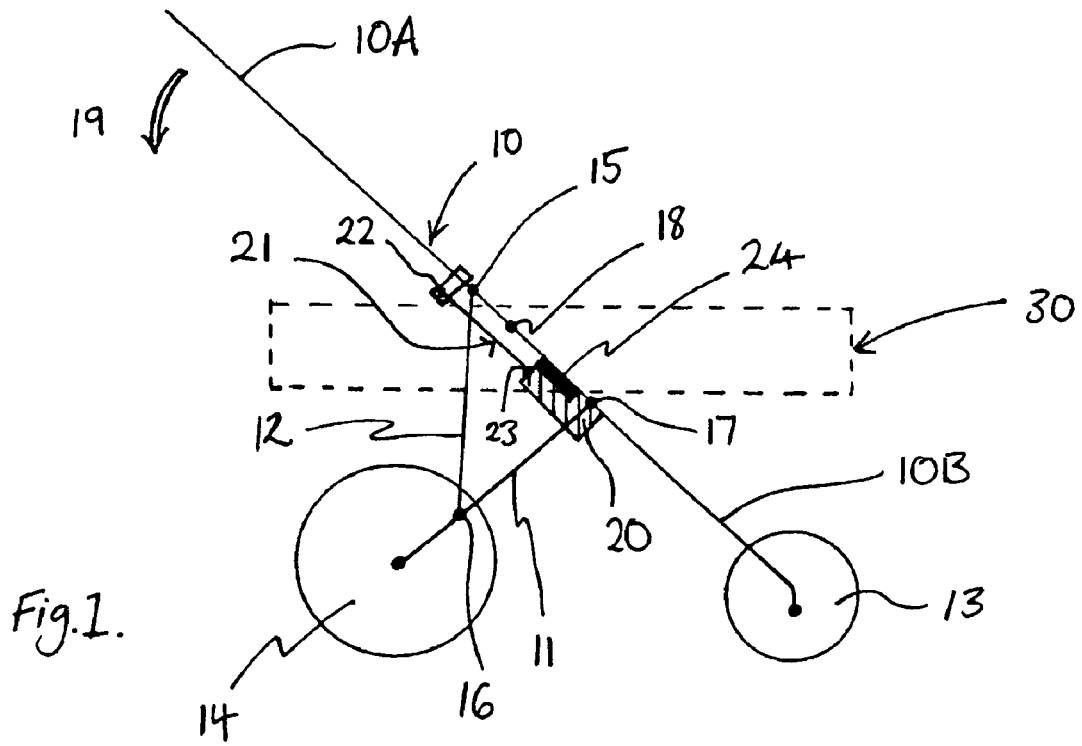
FIG. 1 is a diagrammatic side view of the buggy frame in the unfolded position.

FIG. 1 is a diagrammatic side view of the buggy frame in an unfolded state, ready for use ("the unfolded position"). The buggy consists of two side frames, one for each side, which are spaced apart by cross struts. FIG. 1 shows one side frame; the opposite side frame is identical. The frame consists of a front sloping bar 10, a rear sloping bar 11, and a rear vertical bar 12 (the term "vertical" is used merely for labeling purposes, as the bar 12 is more nearly vertical than the bars 10 and 11). The front and rear bars 10 and 11 have wheels 13 and 14 attached at their lower ends. A handle (not shown) is attached at the upper end of the front sloping bar 10; the handle may consist of a cross-bar between the two side frames. The lower end of the front sloping bar 10 is preferably curved, as shown in the figures, to bring the front wheel 13 backward to some extent.

The bars 10, 11 and 12 are attached to each other by hinges or pivots 15-17. The front bar 10 is made up of two separate segments, the upper front bar segment 10A and the lower front bar segment 10B, which are pivotally connected by a hinge 18. When the frame is locked in the unfolded position, the hinge 18 is held in the position shown in FIG. 1, with the bar 10 straight.

A seat or cot can be attached to the buggy frame, using a support member 20. Alternatively a seat which is convertible to a cot can be attached to the buggy frame. A cot 30 is shown, in broken lines, attached to the buggy frame in FIG. 1. The cot is supported on a cross bar mounted between the support members 20 on each side of the buggy (the cross bar is not shown in the figures). The cot 30 can be rigid, if the buggy is only to fold front to back, or flexible, if the buggy is to fold side to side also.

The support member 20 is slidably attached to the lower front bar 10B. The support member 20 has a bulbous protrusion which engages with a corresponding groove, running along the length of the lower front bar 10B, so that the support member 20 can slide along the lower front bar 10B. A rod 21 connects the support member 20 to the upper front bar 10A; more specifically, the rod 21 is attached to the upper front bar 10A at pivot point 22 and to the support member 20 at pivot point 23.

Figure 2:
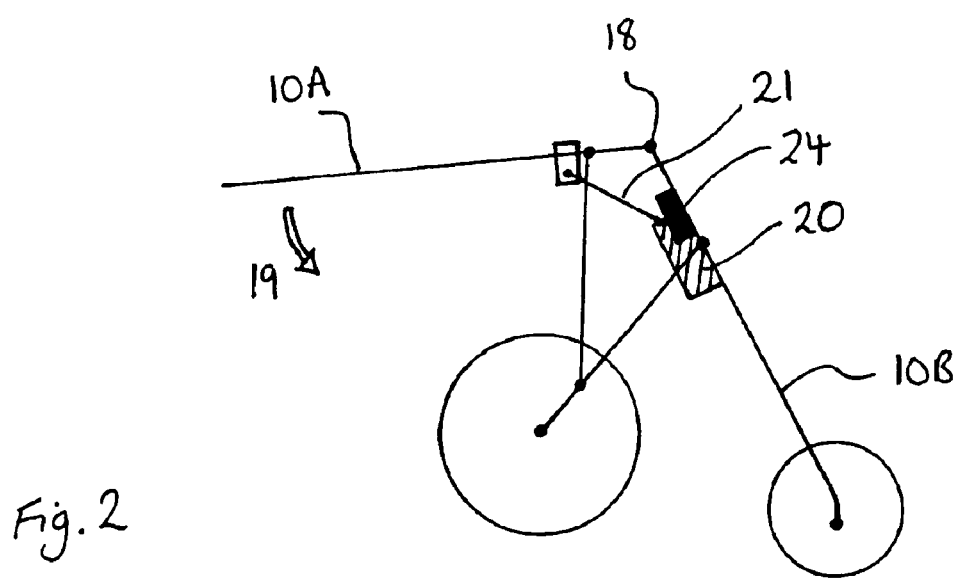
FIG. 2 is a diagrammatic side view of the buggy frame during folding.

Referring to FIG. 2, the hinge 18 allows the front bar 10 to fold, in order to collapse the frame. The upper front bar 10A and lower front bar 10B pivot about the hinge 18, the upper front bar 10A pivoting towards the rear wheel 14, as indicated by arrow 19. This allows the buggy to be folded into a compact form for storage (the folded position). As the upper front bar 10A pivots from the unfolded position to the folded position, the support member 20 is caused to slide downwards along the lower front bar 10B. Similarly, as the buggy is converted from the folded position to the unfolded position, the support member 20 is caused to slide upwards along the lower front bar 10B. When the buggy is in the unfolded state, the support member 20 abuts against a stop 24, which prevents the support member 20 from sliding further upwards along the lower front bar 10B. The stop 24 can also incorporate a locking mechanism, locking the stop 24 and the support member 20 together, to lock the buggy in the unfolded position.

Figure 3:
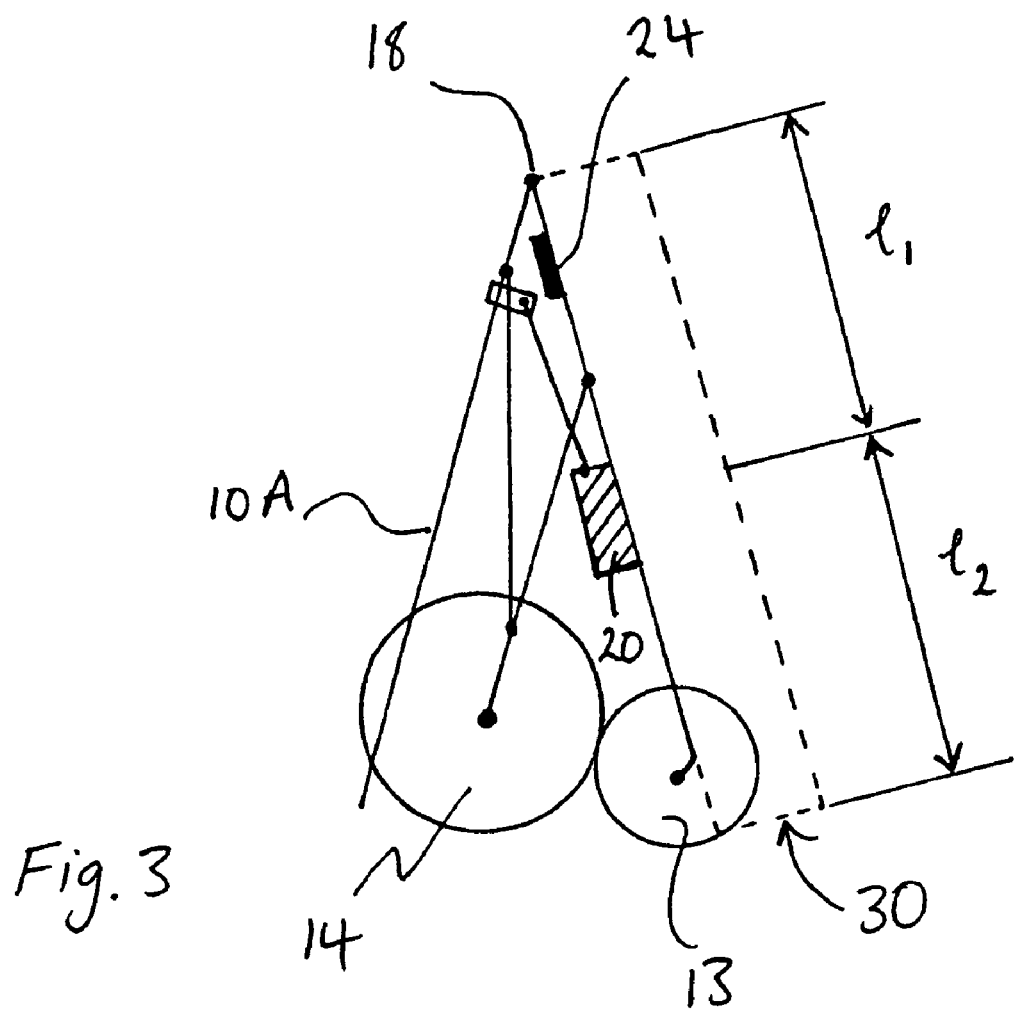
FIG. 3 is a diagrammatic side view of the buggy frame in the folded position.

FIG. 3 is a diagrammatic view of the side frame in the folded position. In the folded position, the dimensions of the frame are such that support member 20 is located roughly midway between the hinge 18 and the edge of the wheel 13. The support member 20 is located a distance $l_1$ from the hinge 18 and a distance $l_2$ from the outer edge of the wheel 13, where distances $l_1$ and $l_2$ are approximately equal.

The support member 20 is attached to the cot 30 roughly midway between the front end and the rear end of the cot 30. The length of the base of the cot 30, between the front and rear ends, is roughly the distance $l_1+l_2$. The cot 30 is able to pivot about the support members 20, so that the cot base may be horizontal when the buggy is in the unfolded position. When the buggy is in the folded position, the cot can pivot about support members 20 so that the base of the cot lies parallel with the lower front bar 10B.

As the buggy frame is folded from the unfolded to the folded state, the support member 20 slides along the lower front bar 10B, and the cot 30, which is attached to the support member, also moves with the support member, towards the front wheel 13. When the buggy is in the folded state, as shown in FIG. 3, the base of the cot 30 is parallel with the lower front bar 10B and the front and rear ends of the cot 30 are close to the ends of the folded pushchair. The rear end of the cot 30 is close to the hinge 18 and the front end of the cot 30 is close to the outer edge of wheel 13. Therefore, when the buggy is in the folded state the cot does not protrude out from the edges of the folded buggy frame. In going from the unfolded position to the folded position, the support member 20 slides down the lower front bar 10B until the support member is located half-way between the hinge 18 and the outer edge of wheel 13. Therefore the length of the folded buggy is no longer than the length of the cot. This makes the folded buggy easy to store as the different components fold compactly together.

If a seat is attached to the buggy frame in place of the cot 30, the length of the seat from its top to its bottom should be roughly equal to the distance $l_1+l_2$. The support members 20 should be attached to the seat roughly midway between the top and bottom of the seat. Therefore, when the buggy is in the folded state, the seat will not protrude from the edges of the folded buggy frame.

Alternatively, the support member can be attached to the cot 30 at a point other than the mid-point along the base of the cot. The dimensions of the buggy frame will be adjusted accordingly so that when the buggy is in the folded state, the cot will not protrude from the edges of the folded buggy frame.

The buggy frame of the present invention can be used for a three or four wheeled buggy. For a four wheeled buggy, the chassis will consist of two side frames of FIGS. 1-3, each having a front and back wheel, the side frame being separated by cross struts. For a three wheeled buggy, each side frame will have a respective rear wheel 14; however, the front wheel 13 will be shared.

Alternative embodiments using the principles disclosed will suggest themselves to those skilled in the art upon studying the foregoing description and the drawings. It is intended that such alternatives are included within the scope of the invention, which is limited only by the claims.

I claim:

1. A foldable buggy having a pair of side frames each comprising:
    a front strut having an upper section, a lower section, and a hinge between a lower end of the upper section and an upper end of the lower section, whereby the front strut can move between an unfolded position with the sections generally aligned with each other and a folded position;
    a front wheel at a lower end of the lower section;
    a rear strut having an upper end pivoted on the lower section between the hinge and the front wheel;
    a rear wheel at a lower end of the rear strut;
    a vertical strut having an upper end pivoted on the upper section between the hinge and an upper end of the upper section and a lower end pivoted on the rear strut;
    a slide slidable along the lower section and adapted to support a respective side of a child support; and
    a link having a lower end pivoted on the slide and an upper end pivoted on the upper section and constraining the upper section to pivot rearward and downward on movement between the unfolded and folded positions such that in the folded position the front and rear wheels are juxtaposed and the slide is moved from the hinge toward the front wheel.

2. The foldable baby buggy defined in claim 1 wherein the child support is a cot or seat.

3. The foldable baby buggy defined in claim 1 wherein in the unfolded position the slides are positioned centrally between the front wheel and an upper end of the upper section.

4. The foldable baby buggy defined in claim 1 wherein the child support has a predetermined length and is generally centrally mounted on the slides, the struts being dimensioned such that in the folded position the slide is generally centrally positioned on the lower section.

5. The foldable baby buggy defined in claim 4 wherein the length of the child support corresponds generally to a length of the lower section and front wheel together.

6. The foldable baby buggy defined in claim 4 wherein the child support is a cot pivotal on the slides between a position parallel to the lower sections and a position extending transversely across the lower sections.

* * * * *